Dec. 4, 1934.    T. R. RHODES    1,982,882
FLIGHT RECORDER FOR AIRCRAFT
Filed March 6, 1933    2 Sheets-Sheet 2
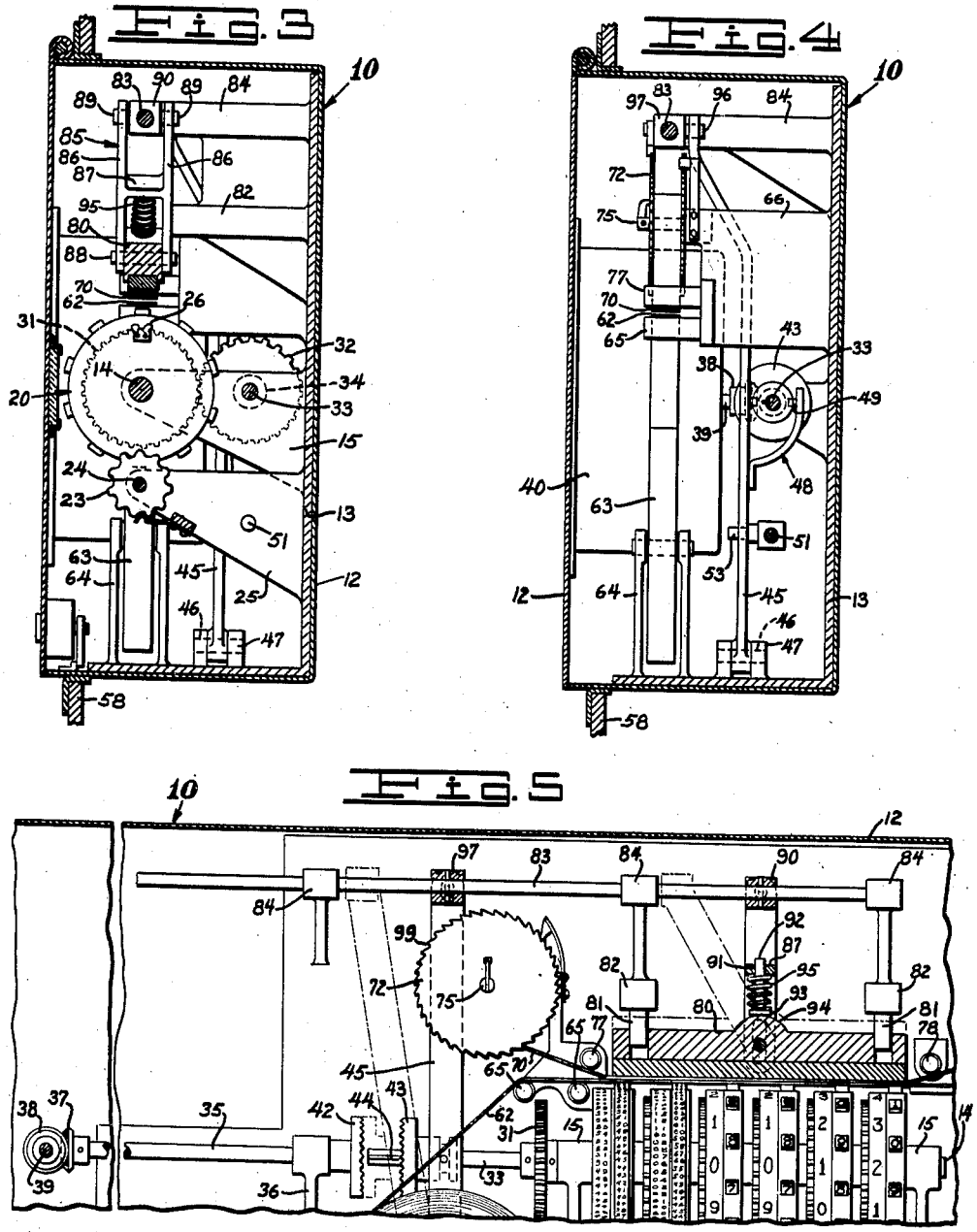
INVENTOR.
THORNTON R. RHODES.
BY
ATTORNEY.

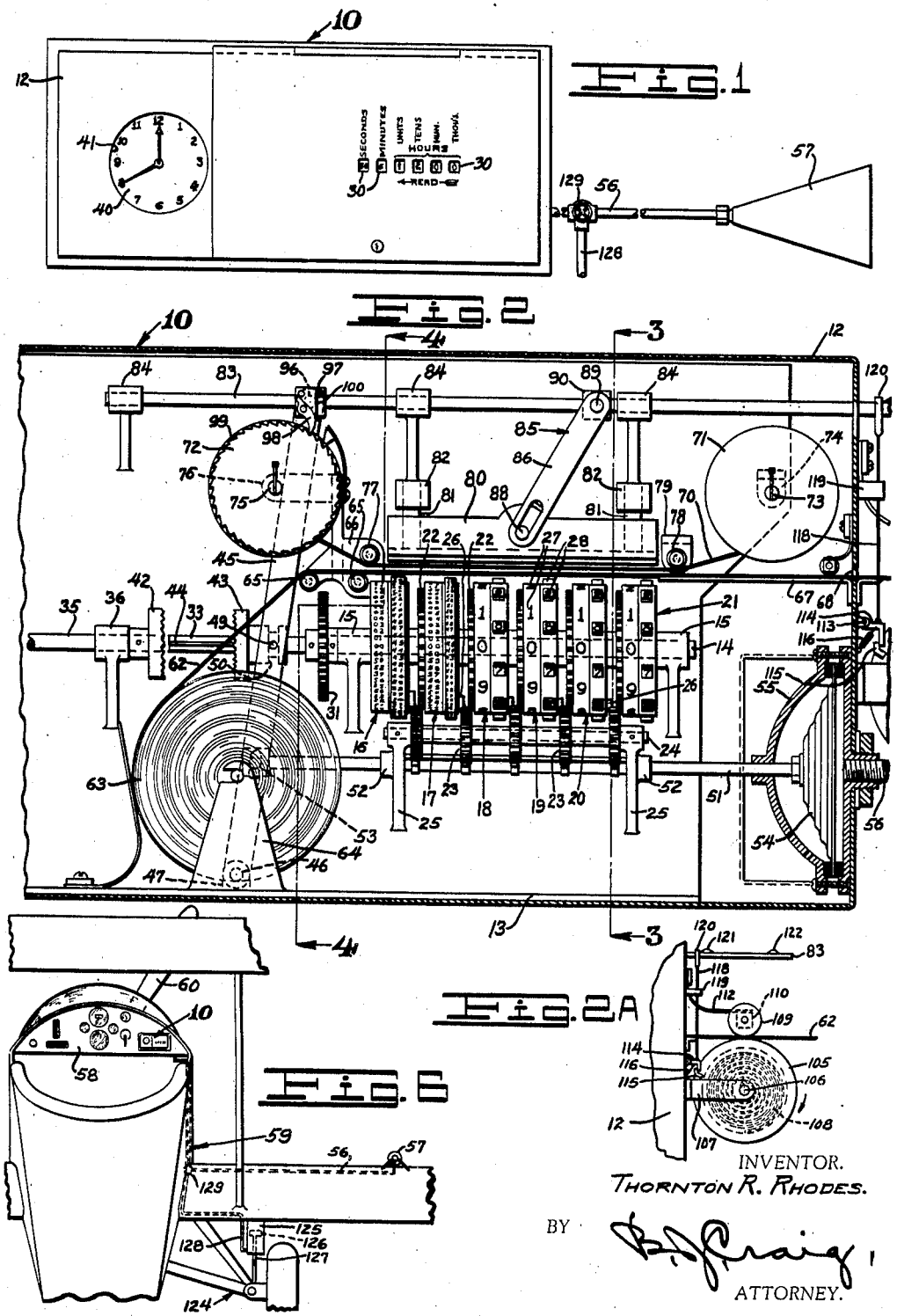

Patented Dec. 4, 1934

1,982,882

UNITED STATES PATENT OFFICE 1,982,882

FLIGHT RECORDER FOR AIRCRAFT

Thornton R. Rhodes, Riverside, Calif.

Application March 6, 1933, Serial No. 659,636

3 Claims. (Cl. 234—36)

This invention relates to flight recorders for aircraft.

The general object of this invention is to provide a novel apparatus for recording the time an aircraft has been in operation.

A further object of the invention is to provide a novel means for indicating and making a permanent record of the time an aircraft has been in operation.

Other objects and the advantages of this invention will be apparent from the following description taken in connection with the accompanying drawings wherein:

Fig. 1 is a front view of my improved flight indicating and recording device;

Fig. 2 is an enlarged fragmentary longitudinal section through the device;

Fig. 2A is a fragmentary side elevation of the device on a reduced scale showing the tape feeding mechanism;

Fig. 3 is a section taken on line 3—3 of Fig. 2;

Fig. 4 is a section taken on line 4—4 of Fig. 2;

Fig. 5 is a fragmentary view similar to Fig. 2 showing portions of the device actuated to different position; and, Fig. 6 is a fragmentary view of a portion of an airplane showing my improved flight recorder operatively installed thereon.

Referring to the drawings by reference characters I have indicated my improved flight indicator and recording device generally at 10. As shown the device 10 includes a housing 12 having a supporting frame 13 positioned therein.

Mounted on a shaft 14 which is rotatably mounted in bearings 15 of the frame 13 I provide a plurality of counter discs 16, 17, 18, 19, 20 and 21. The disc 16 is secured to the shaft 14 while the rest of the discs are freely rotatable on the shaft. The discs 17, 18, 19, 20 and 21 each include a gear toothed portion 22 which meshes with an associated gear 23 loosely mounted on a shaft 24 which is supported in brackets 25 on the frame 13. The discs 16, 17, 18, 19 and 20 each include a gear toothed member 26 (see Fig. 3) which is adapted to mesh with its associated gear 25 and rotate it a predetermined amount upon each revolution of the discs in the usual manner of counter disc actuation.

The counter discs each include two portions, one portion thereof having visible indicating data thereon such as indicated at 27 and the other portion having raised printing type thereon as indicated at 28.

The two portions of the counter disc 16 is divided into sixty equal spaces and the indicia 27 and the type 28 thereon represent the seconds of a minute.

The two portions of the counter disc 17 like those of the counter disc 16 are divided into sixty equal spaces and the indicia 27 and the type 28 thereon represent the minutes of an hour.

The two portions of the remaining counter discs 18, 19, 20 and 21 are divided into two spaces and the indicia 27 and type 28 thereon represent hours.

One digit of the indicia 27 of each of the counter discs is adapted to be viewed through suitable apertures 30 provided in the housing 12 (see Fig. 1).

Secured to the shaft 14 I provide a gear 31 which meshes with a gear 32 secured to a shaft 33 which is journaled in bearing portions 34 on the bearings 15 (see Fig. 3).

Coaxial with the shaft 33 I provide a shaft 35 which is journaled in bearings 36 on the frame 13. The shaft 35 has a bevel gear 37 secured thereto which meshes with a bevel gear 38 secured to a shaft 39 which is a part of the actuating mechanism of a clock device 40, which is suitably mounted in the housing 12 (see Figs. 4 and 5). The face of the clock 40 is preferably visible through an aperture 41 in the housing 12. Secured to the shaft 35 adjacent the shaft 33 I provide a toothed clutch member 42 which is adapted to be engaged by a similarly toothed clutch member 43 slidably mounted on the shaft 33. The clutch member 43 is retained in rotatable engagement with the shaft by a spline 44.

When the clock 40 is operating and the clutch members 42 and 43 are in engagement the shaft 14 makes one revolution each minute thus the counter disc 16 makes one revolution a second. The clutch member 43 is adapted to be actuated by an arm 45 which is pivotally mounted as at 46 to a bearing 47 on the frame 13. Intermediate the length of the arm 45 I provide a shifting portion 48 having shifting pins 49 thereon positioned in an annular groove 50 provided on the clutch member 43.

For actuating the arm 45 I provide a rod 51 which is slidably mounted in bearing portions 52 on the brackets 25. One end of the rod 51 is pivotally connected as at 53 to the arm 45 intermediate its pivot 46 and the points 49 (see Figs. 2 and 4). The opposite end of the rod 51 is suitably connected to a diaphragm member 54 which is supported in a casing 55. Communicating with the interior of the casing 55 on the side of the diaphragm 54 opposite the rod 51 I provide a conduit 56 which is preferably flexible.

The opposite end of the conduit 56 communicates with the interior of a funnel member 57 (see Figs. 1 and 6).

As shown in Fig. 6 the housing 12 is preferably mounted on the instrument board 58 of an airplane 59 and the funnel 57 is adapted to be supported on a portion of the airplane out of the path of the air currents from the propeller 60 with the large end of the funnel directed forward. It will be understood however that the member 57 may be mounted wherever it will be operated by air currents.

When the airplane travels at flying speed the air currents produce a pressure in the conduit 56 which causes the diaphragm 54 to expand thereby moving the rod 51 towards the arm 45. As the rod 51 is thus moved it swings the arm 45 about its pivot 46 from the position shown in Fig. 2 to the position shown in broken lines in Fig. 5 and as the arm 45 thus moves it moves the clutch member 43 into engagement with the clutch member 42. Thereby actuating the counter discs as previously described.

When the airplane lands and the air currents in the funnel 57 decreases the diaphragm member 54 retracts and moves the rod 51 in a direction away from the arm 54 thereby swinging the arm 45 about its pivot away from the clutch member 42 thereby disengaging the clutch members whereupon the actuation of counter discs cease.

From the foregoing it will be apparent that an operator by observing the data on the counter discs visible through the apertures 30 in the housing 12 can determine the time elapsed during the flight of the airplane by subtracting the previously indicated time from the new indicated time shown by the counter discs.

For making a permanent record of the elapsed time of each flight of the aircraft I provide a recording tape 62 which may be of any standard type wound upon itself into a spool 63. The spool 63 is shown as rotatably supported by brackets 64 on the frame 13. The tape 62 is adapted to be positioned above and adjacent the counter discs and is shown as supported in an operating position by rollers 65 rotatably mounted on a bracket 66 of the frame 13 and by a shelf 67 secured to the housing 12. The tape 62 passes out of the housing 12 through an aperture 68 therein.

Positioned above the tape 62 I provide an inked ribbon 70 which is mounted on a spool 71 and adapted to be unwound therefrom onto a spool 72. The spool 71 is mounted on a spindle 73 rotatably supported in a bearing 74 and the spool 72 is mounted on a similar spindle 75 rotatably supported by a bearing portion 76 of the bracket 66. The working portion of the ribbon 70 is retained in position adjacent the tape 62 by a roller 77 rotatably mounted on the bracket 66 and by a roller 78 rotatably mounted in a bearing 79.

Positioned above the working portion of the ribbon 70 I provide a printing block or platen 80 slidably mounted on vertical pins 81 which are secured to brackets 82 on the frame 13. The pins 81 prevent horizontal movement of the block 80 but the block is free to move vertically. Positioned above the block 80 I provide a horizontal bar 83 which is slidably supported in bearings 84 of the frame 13. For actuating the printing block 80 I provide a saddle member 85 which includes spaced arms 86 connected intermediate their length by a web 87 (see Fig. 3). The arms 86 are slackly pivotally connected adjacent one end to the printing block 80 as at 88 and adjacent their opposite ends the arms 86 are pivotally connected as at 89 to a block 90 secured to the bar 83.

Positioned in an aperture 91 of the web 81 I provide a plunger 92 having an enlarged head 93 thereon which engages an arcuate portion 94 of the printing block 80 (see Fig. 5). Surrounding the plunger 92 between the head 93 thereof and the web 87 I provide a coiled spring 95 which resiliently urges the printing block to the limit of its downward movement relative to the saddle member.

When the block 90 on the rod 83 is in either of its extreme positions at the sides of the vertical center of the pivot 88 the saddle member 85 supports the printing block 80 in a raised position and out of engagement with the ribbon (as shown in Fig. 2). As the block 90 on the rod 83 moves toward a position above the pivot 88 the printing block 80 is moved into engagement with the ribbon 70 which in turn is moved into engagement with the tape 62 which in turn is moved into engagement with the type portions 28 of the counter discs thereby impressing a facsimile of the type on the record tape 62 (see Fig. 5).

The end of the arm 45 opposite its pivot 46 is slackly and pivotally connected as at 96 to a block 97 secured to the rod 83. Thus when the arm 45 is actuated to move the clutch member 43 into engagement with the clutch member 42 the bar 83 is moved thereby causing a printing operation of the printing block 80. And when the arm 45 is actuated to disengage the clutch members 42 and 43 the bar 83 is again moved which again causes a printing operation of the printing block 80.

Thus it will be apparent that when the aircraft starts its flight a permanent record of the data indicated on the type from the previous flight will be permanently recorded on the tape 62 and when the aircraft ceases its flight the data then indicated on the type will be permanently recorded on the tape 62 and the time elapsed during the flight may be determined by subtracting the previously recorded time from the last recorded time.

Pivotally mounted on the block 97 I provide a dog member 98 which is urged into engagement with ratchet teeth 99 on the spool 72 by a spring member 100 secured to the block 97. The dog member 98 is adapted upon a return movement of the bar 83 to its initial position to rotate the spool 72 a predetermined distance to wind the ribbon 70 onto the spool.

Adjacent the aperture 68 in the housing 12 I provide a tape feed roller 105 which is rotatably mounted on a shaft 106 supported by bearing members 107 on the housing. The feed roller 105 is adapted to be urged to rotate in the direction indicated by the arrow in Fig. 2A by a coiled spring 108 contained in the roller.

Above the axis of the feed roller 105 I provide a tension roller 109 which is rotatably mounted on a bearing block 110 which is in turn mounted on a flat spring member 112 secured to the housing 12.

Pivotally mounted on the housing 12 as at 113 I provide a locking dog member 114 which is normally urged into engagement with a stop member 115 on the roller 105 by a spring 116.

For operating the dog member 114 I provide a vertical rod 118 which is slidably mounted in bearing portions 119 on the housing and includes a yoke portion 120 in which the bar 83 is positioned. The top portion of the yoke 120 normally rests on the bar 83. On the bar 83 I provide cam members 121 and 122 which are adapted when the bar 83 moves to raise the rod 118 which in turn will move the dog member 114 out of engagement with the stop 115 on the roller 105. The cam members 121 and 122 are positioned on the bar 83 so that they raise the rod 118 at the start of the travel of the bar 83 and also just prior to the stopping of the bar. Thus each time the bar travels from one extreme position to the other the dog member 114 is moved out of engagement with the stop 115 on the roller 105 twice and each time the dog 114 is thus moved the spring 106 rotates the roller one revolution.

The tape 62 is adapted to be positioned between the feed roller 105 and the tension roller 109 so that each time the feed roller 105 rotates it pulls a predetermined length of the tape 62 out of the housing 12.

Mounted on a portion of the airplane adjacent the landing gear 124 thereof I provide a cylinder 125 having a piston 126 therein which includes a piston rod 127 extending out of the cylinder. The piston rod 127 is suitably connected to a portion of the landing gear 124 and is adapted to move with the landing gear. One end of a conduit 128 communicates with the interior of the cylinder 125 adjacent the lower end thereof.

Adjacent the housing 12 the conduit 56 has a three-way valve 129 interposed therein with which the opposite end of the conduit 128 communicates. In one position the valve 129 allows free passageway through the conduit 56 from the funnel 57 to the diaphragm chamber and restricts passageway through the conduit 128. In its other position the valve 129 restricts passageway from the funnel 57 into the diaphragm chamber and allows free passage from the conduit 128 into the diaphragm chamber.

When the airplane rises off the ground and the landing gear 124 moves downward the piston 126 moves downward thereby forcing air through the conduit 128 which actuates the diaphragm 54 to operate the arm 45 and when the airplane lands and the landing gear 124 moves upward the piston 126 moves upward thereby drawing air out of the diaphragm chamber and releasing the pressure on the diaphragm 54 which again operates the lever 45.

From the foregoing description it will be apparent that I have provided a novel flight indicator and recording device for aircraft which is simple in construction and highly efficient in use.

Having thus described my invention, I claim:

1. In a device for recording the time an aircraft is in flight, said device including a time printer, means to drive said time printer, a coupling device for operatively connecting together said drive means and said printer, a diaphragm member actuated by movement of air currents, and means actuated by said diaphragm and operable to cause said printer to print.

2. In a device for registering elapsed time during which an aircraft is in motion, comprising a continuously operating drive means, a device for registering the period of movement of the aircraft, a separable coupling device for operatively connecting together said drive means and said registering device, means whereby air pressure created by the operation of said aircraft actuates said coupling device to drive said registering device and means whereby upon discontinuation of said air pressure said coupling means is actuated to discontinue driving said registering device, means operable to produce a permanent record of the data indicated by said registering device, and means to cause said last mentioned means to actuate at the start of operation of said registering means and at the stopping of said registering means.

3. In a flight indicator including a device for registering the period of flight of an aircraft, a continuously operating drive means, a separable coupling device for operatively connecting together said drive means and said registering device, a casing, a diaphragm member in said casing, a conduit opening at one end into said casing on one side of said diaphragm, the opposite end of said conduit including an entrance, means whereby expanding movement of said diaphragm operatively connects said coupling members to drive said registering device, means whereby retraction of said diaphragm disconnects said coupling members to discontinue operation of said registering device, a recording tape, means operable to print upon said tape the data indicated by said registering device, means whereby said printing means is operated to print on said tape as said diaphragm expands and as said diaphragm is retracting.

THORNTON R. RHODES.